(12) United States Patent
Slagle

(10) Patent No.: US 7,148,967 B1
(45) Date of Patent: Dec. 12, 2006

(54) HYPER-SPECTRAL/CONTINUOUSLY-TUNABLE IMAGER

(75) Inventor: Glenn B. Slagle, McLean, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 63 days.

(21) Appl. No.: 11/158,356

(22) Filed: Jun. 21, 2005

(51) Int. Cl.
G01J 3/51 (2006.01)

(52) U.S. Cl. ...................................... 356/419; 250/226
(58) Field of Classification Search ................ 356/416, 356/419
See application file for complete search history.

(56) References Cited

U.S. PATENT DOCUMENTS 6,335,759 B1 * 1/2002 Harada ........................ 348/373
6,495,818 B1 * 12/2002 Mao ............................ 250/226

FOREIGN PATENT DOCUMENTS

WO    WO 97/42765    * 11/1997

* cited by examiner

Primary Examiner—F. L. Evans
(74) Attorney, Agent, or Firm—Andrew Romero

(57) ABSTRACT

The invention employs a linear variable interference filter, which can be manually moved back and forth along its long axis in front of a slit parallel to its short axis. Thus, the filter pass-band varies linearly from 4,000 angstroms to 10,000 angstroms with a pass-band half-width no greater than 65 angstroms. Therefore, this combination of filter and slit can be placed in front of a charge coupled device (CCD) or other electro-optical imaging device and real time images can be taken as the filter is slid back and forth. Magnifying optics, beam-splitters and scale illuminators can be used to make the scale visible within the field of view of the camera imager. Or, as a simpler embodiment, the graduated image scale could in the form of a hologram of a graduated image scale taken at distance consistent with the desired depth of focus of the camera/imager.

13 Claims, 2 Drawing Sheets ically, one object of the present invention is to
HYPER-SPECTRAL/CONTINUOUSLY-TUNABLE IMAGER

GOVERNMENT INTEREST

The invention described herein may be manufactured, used, sold, imported, and/or licensed by or for the Government of the United States of America.

FIELD OF INTEREST

The invention relates to instrumentation for viewing and recording hyper-spectral or continuously tunable narrow band visible and infrared imagery in standard National Television System Committee (NTSC) or other video formats.

BACKGROUND OF THE INVENTION

Current prior art for tunable narrow-band imagery requires using grated spectrograph techniques. Most known devices utilize a double slit spectrograph that provides for the synchronous scanning of both slits across two image planes, one slit scans the input image plane and the other slit scans the viewing or camera image plane. In more advanced known art, the scanning motion is produced by moving a platform, such as an aircraft flying a straight and level course over terrain to be imaged. In this case the second slit is replaced by a Charge Coupled Device (CCD) linear array (or rectangular array so that line scans of multiple wavebands can be obtained simultaneously). In these systems, the synchronous scanning of the second slit is accomplished electronically and generally involves computer processing and digital hard drive memory storage.

The disadvantages of the current art are 1) the inability to image or view an image scene in real time (or at least within the time of one NTSC videoframe); 2) the relative size, weight and bulk of the current systems due to the required optical paths, the large amount of digital processing equipment to store and read out the images; and 3) the high power consumption (100s of watts). These disadvantages make the current systems prohibitive for a wide range of in-field scientific, military, criminal forensic and homeland security applications.

Accordingly, there is in a need in the prior art to make a hyper-spectral or continuously tunable narrow band visible and infrared imager that is low power, portable, and can view and record images in real time. The present invention addresses these needs.

SUMMARY OF THE INVENTION

Accordingly, one object of the present invention is to provide a hyper-spectral or continuously tunable narrow band visible and infrared imager that is low power, portable, and can view and record images in real time.

The invention accomplishes this objective and others by employing a linear variable interference filter instead of the conventional grating spectrograph. By moving the filter back forth along its long axis in front of a slit parallel to its short axis, the filter pass-band varies linearly from 4,000 angstroms to 10,000 angstroms with a pass-band half-width no greater than 65 angstroms. Therefore, this combination of filter and slit can be placed in front of a charge coupled device (CCD) or other electro-optical imaging device and real time images can be taken as the filter is slid back and forth. Magnifying optics, beam-splitters and scale illuminators can be used to make the scale visible within the field of view of the camera imager. Or, as a simpler embodiment, the graduated image scale could in the form of a hologram of a graduated image scale taken at distance consistent with the desired depth of focus of the camera/imager.

BRIEF DESCRIPTION OF THE DRAWINGS

These and other objects of the invention will become readily apparent in light of the Detailed Description Of The Invention and the attached drawings wherein.

DETAILED DESCRIPTION OF THE INVENTION

The invention is a hyper-spectral or continuously tunable imager. It provides a means for viewing and recording hyper-spectral, narrow-band visible and infrared imagery in a standard NTSC or other video format. The invention also provides a way of identifying the center wavelength of each recorded video frame in a way such that it will remain with the image regardless of what subsequent digitizing or processing is performed on the video frame.

The invention is a hand held sensor that can interfere directly with standard analog or digital video recorders and has a 90° field of view. It is intended for daylight operation. The power source required is for the charge coupled device (CCD) infrared (IR) sensitive camera.

The invention employs a linear variable interference filter instead of the conventional grating spectrograph to provide the continuously tunable or hyper-spectral imaging. Such filters are commercially available and nominally are 5 mm thick glass pieces measuring 25 mm high by 200 mm long. By moving the filter back forth along its long axis in front of a slit parallel to its short axis, the filter pass-band varies linearly from 4,000 angstroms to 10,000 angstroms with a pass-band half-width no greater than 65 angstroms. The sensor's pass-band (half-width) is nominally 25 angstroms at 4000 angstroms and 65 angstroms at 0.9 microns. Therefore, this combination of filter and slit can be placed in front of a charge coupled device (CCD) or other electro-optical imaging device and real time images can be taken as the filter is slid back and forth. Nominally, a camera to be used for the invention would be one with an object lens aperture of 3 mm or less with respect to the long (variable wavelength) axis of the variable filter.

What one would see with the filter at rest in any position would be a narrow-band image at the wavelength corresponding to that particular filer position. In order to superimpose the instantaneous center wavelength of the filter on the image, a graduated wavelength scale is affixed directly on or near the edge of the filer when it is initially calibrated. Magnifying optics, beam-splitters and scale illuminators can be used to make the scale visible within the field of view of the camera imager. Or, as a simpler embodiment, the graduated image scale could in the form of a hologram of a graduated image scale taken at distance consistent with the desired depth of focus of the camera/imager.

Figure 1:
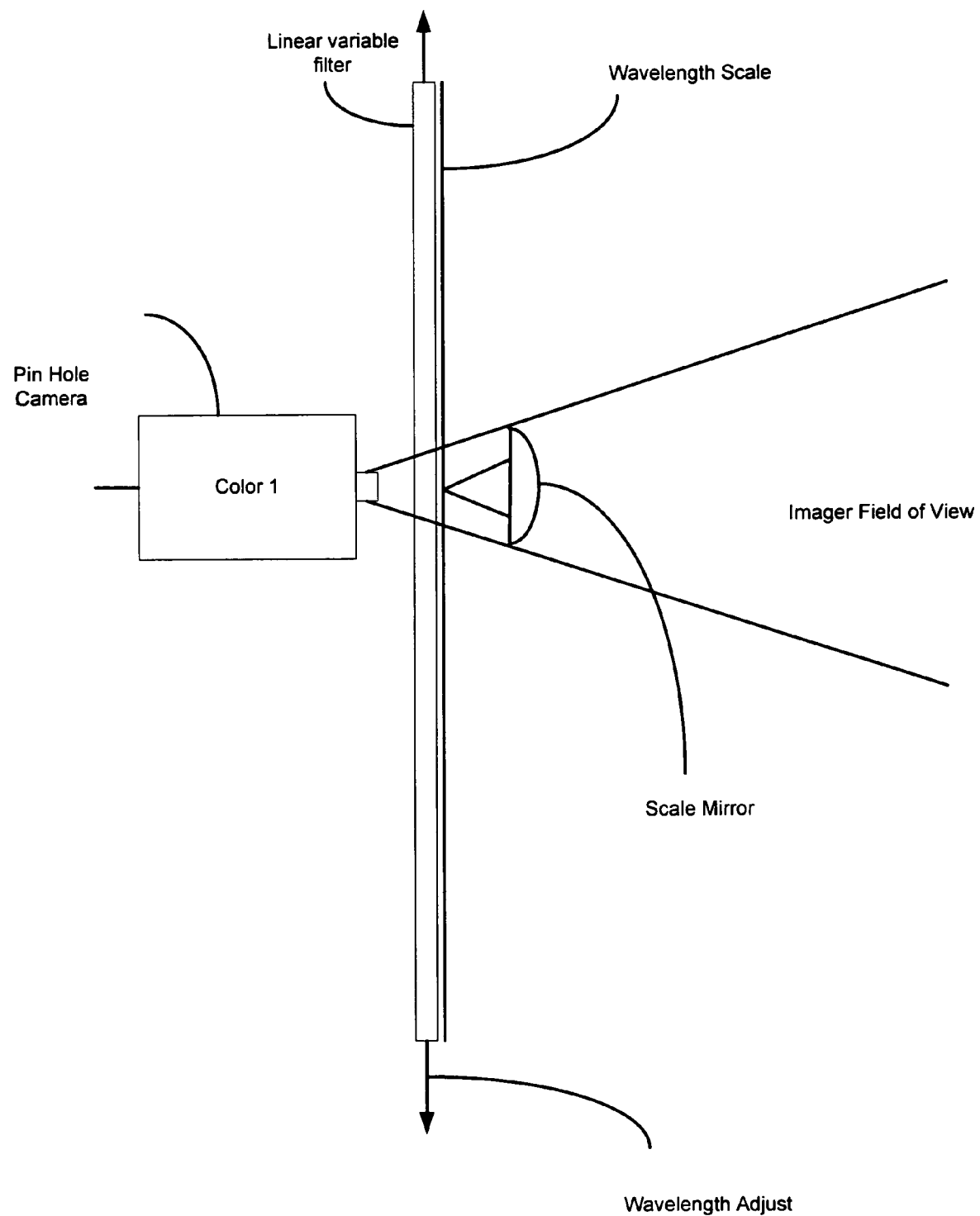
FIG. 1 is a schematic representation of the invention.

FIG. 1 is a schematic representation of one embodiment of the invention. As shown, the linear variable interference filter is placed directly in front of the CCD camera with a pin hole lens. In operation, the linear variable interference filter is moved laterally across the front of the camera, thereby changing the image as described previously. A calibrated wavelength scale, which can actually be a mirror reversed on the edge of the filter mount, is mounted along the length of the filter with a concave mirror to project the wavelength scale in the camera field of view.

Figure 2:
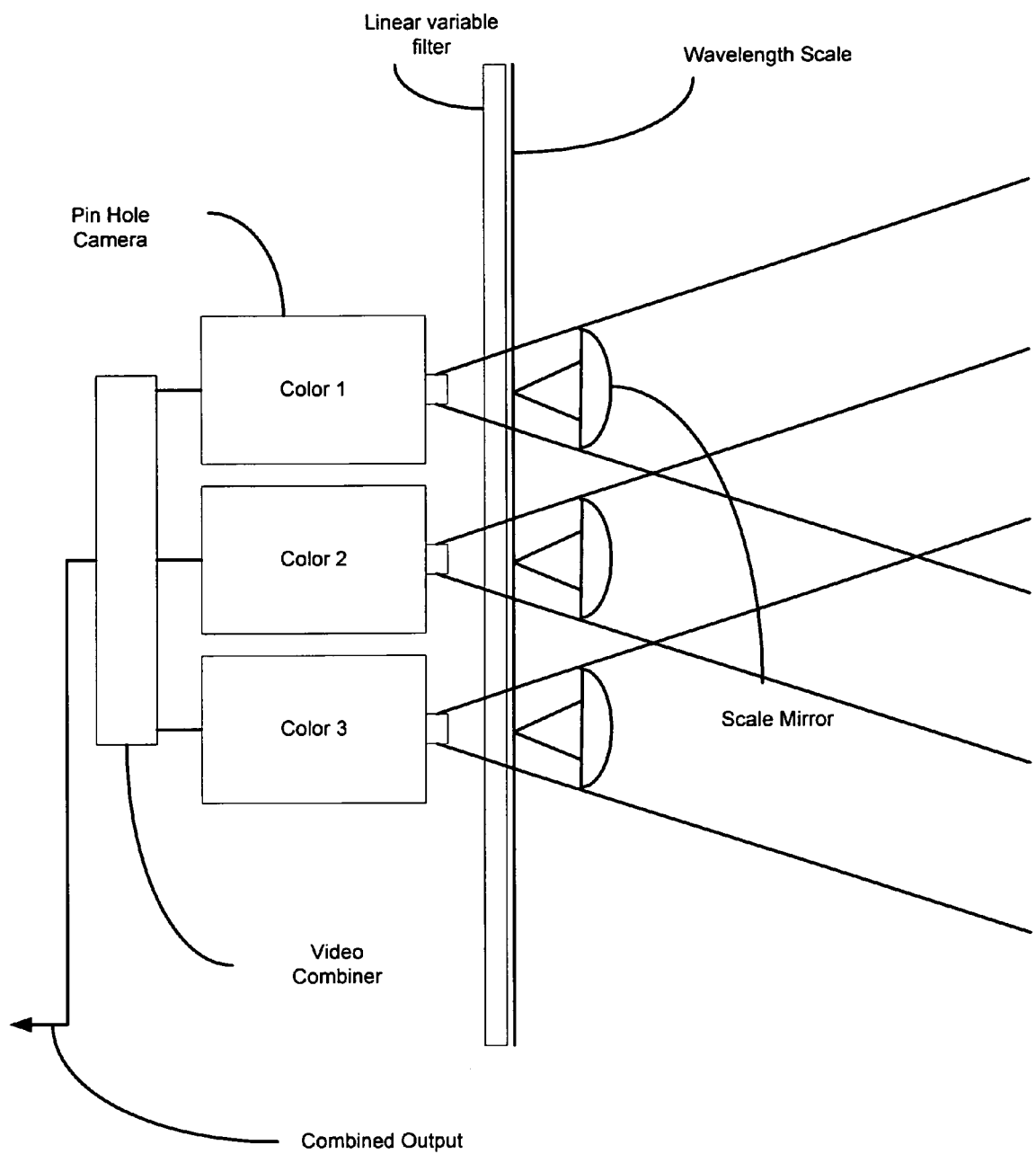
FIG. 2 is schematic representation of another embodiment of the invention.

FIG. 2 shows a schematic representation of a second embodiment of the invention as a 3-color version of the invention. As shown, three identical pin hole CCD cameras are placed along the linear variable interference filter, along with the wavelength scale and mirrors to project the wavelength scale in the fields of view of the CCD cameras. A video combiner, then, combines the blue yellow and red colors, one each of the cameras, and outputs the combined colors out to a recorder or image viewing device.

Of course, those skilled in the art could devise any number of different embodiments of the invention, including moving the filter automatically via some means or adjusting the wavelengths and pass-bands to fit any need.

What is claimed is:

1. A hyper-spectral imager comprising
   An imager with a pin hole lens; and
   A linear variable interference filter adjustably mounted in front of the imager.

2. The hyper-spectral imager of claim 1 further comprising a wavelength scale attached to the filter and means to show the scale in a field of view of the imager.

3. The hyper-spectral imager of claim 1 wherein a pass-band of the filter varies linearly from 4,000 angstroms to 10,000 angstroms, the pass-band having half-width no greater than 65 angstroms.

4. The hyper-spectral imager of claim 1 further compromising a graduated image scale in the form of a hologram, the image scale being projected in a field of view of the imager.

5. The hyper-spectral imager of claim 4 wherein the image scale is the form of a hologram of a scale taken at a distance consistent with a depth of focus of the imager.

6. The hyper-spectral imager of claim 1 wherein the imager is a charge coupled device camera.

7. A hyper-spectral imager comprising
   A plurality of imagers with a pin hole lenses; and
   A linear variable interference filter adjustably mounted in front of the imagers.

8. The hyper-spectral imager of claim 7 further comprising a wavelength scale attached to the filter and means to show the scale in a field of view of the imagers.

9. The hyper-spectral imager of claim 7 wherein a pass-band of the filter varies linearly from 4,000 angstroms to 10,000 angstroms, the pass-band having half-width no greater than 65 angstroms.

10. The hyper-spectral imager of claim 7 further compromising a graduated image scale in the form of a hologram, the image scale being projected in a field of view of the imagers.

11. The hyper-spectral imager of claim 10 wherein the image scale is the form of a hologram of a scale taken at a distance consistent with a depth of focus of the imagers.

12. The hyper-spectral imager of claim 7 wherein the imagers are a charge coupled device cameras.

13. The hyper-spectral imager of claim 7 further comprising a video combiner to combine the output of the imagers.

* * * * *